US010755566B2

(12) United States Patent
Tennent et al.

(10) Patent No.: US 10,755,566 B2
(45) Date of Patent: Aug. 25, 2020

(54) METHOD AND APPARATUS FOR DETERMINING LOCATION-BASED VEHICLE BEHAVIOR (71) Applicant: HERE Global B.V., Eindhoven (NL)

(72) Inventors: Toby Tennent, Chicago, IL (US); George Filley, Deer Park, IL (US); Tony Belkin, Glenview, IL (US); Kevin Moran, West Dundee, IL (US)

(73) Assignee: HERE GLOBAL B.V., Eindhoven (NL)

(*) Notice: Subject to any disclaimer, the term of this patent is extended or adjusted under 35 U.S.C. 154(b) by 0 days.

(21) Appl. No.: 15/532,739

(22) PCT Filed: Dec. 1, 2015

(86) PCT No.: PCT/IB2015/059267
§ 371 (c)(1),
(2) Date: Jun. 2, 2017

(87) PCT Pub. No.: WO2016/088052
PCT Pub. Date: Jun. 9, 2016

(65) Prior Publication Data
US 2017/0365169 A1 Dec. 21, 2017

Related U.S. Application Data (60) Provisional application No. 62/086,566, filed on Dec. 2, 2014.

(51) Int. Cl.
*B60W 40/09* (2012.01)
*G08G 1/0967* (2006.01)
(Continued)

(52) U.S. Cl.
CPC ....... *G08G 1/096775* (2013.01); *B60W 40/09* (2013.01); *G06Q 10/06* (2013.01);
(Continued)

(58) Field of Classification Search
CPC .......... G08G 1/096775; G08G 1/0112; G08G 1/123; G08G 1/096816; G08G 1/096838;
(Continued)

(56) References Cited

U.S. PATENT DOCUMENTS 5,797,134 A  8/1998 McMillan et al.
7,659,827 B2 * 2/2010 Gunderson ............. G08G 1/16
                                                    340/576
(Continued)

FOREIGN PATENT DOCUMENTS

CN    202075862 U    12/2011
JP    H 09-297898 A  11/1997
(Continued)

OTHER PUBLICATIONS

Guan, Liping et al.; "Traffic Incident Duration Prediction Based on Artificial Neural Network"; 2010 International Conference on Intelligent Computation Technology and Automation (ICICTA); May 11-12, 2010; Changsha, China, 4 pages.
(Continued)

*Primary Examiner* — Nay Tun
(74) *Attorney, Agent, or Firm* — Alston & Bird LLP (57) ABSTRACT A method, apparatus and computer program product are described so as to provide more additional information regarding vehicular behavior. In the context of a method, information is received regarding a location of the vehicle at a plurality of instances in time. The plurality of instances in time define a time period. The method also includes determining an environmental condition at the location during the time period and comparing the behavior of the vehicle to that of other vehicles at the location that are also subjected to the environmental condition. Additionally, the method may determine a score for the vehicle in relation to a risk factor based upon the behavior of the vehicle and the comparison
(Continued)

to other vehicles at the location that are also subjected to the environmental condition.

15 Claims, 4 Drawing Sheets

(51) Int. Cl.
| | |
|---|---|
| *G08G 1/01* | (2006.01) |
| *G08G 1/08* | (2006.01) |
| *G06Q 40/08* | (2012.01) |
| *G06Q 10/06* | (2012.01) |
| *G08G 1/123* | (2006.01) |
| *G01C 21/00* | (2006.01) |
| *B60W 50/00* | (2006.01) |

(52) U.S. Cl.
CPC .......... *G06Q 40/08* (2013.01); *G08G 1/0112* (2013.01); *G08G 1/0129* (2013.01); *G08G 1/0141* (2013.01); *G08G 1/0145* (2013.01); *G08G 1/08* (2013.01); *G08G 1/096716* (2013.01); *G08G 1/096758* (2013.01); *G08G 1/123* (2013.01); *B60W 2050/0031* (2013.01); *B60W 2555/20* (2020.02); *B60W 2556/45* (2020.02); *B60W 2556/50* (2020.02); *G01C 21/00* (2013.01)

(58) Field of Classification Search
CPC .... G08G 1/096827; G08G 1/20; G08G 1/205; G08G 1/0129; G08G 1/0141; G08G 1/0145; G08G 1/08; G08G 1/096716; G08G 1/096758; B60R 25/102; B60R 25/33; G01C 21/3415; G01C 21/3461; G01C 21/00; G06Q 10/0635; G06Q 10/0833; G06Q 30/0207; G06Q 40/08; G06Q 10/06; G07C 5/008; B60W 40/09; B60W 2556/50; B60W 2556/45; B60W 2555/20; B60W 2050/0031

See application file for complete search history.

(56) References Cited

U.S. PATENT DOCUMENTS

| | | | |
|---|---|---|---|
| 8,311,858 B2 | 11/2012 | Everett et al. | |
| 8,731,768 B2 | 5/2014 | Fernandes et al. | |
| 8,854,199 B2 | 10/2014 | Cook et al. | |
| 9,613,529 B2 | 4/2017 | Downs et al. | |
| 9,727,920 B1* | 8/2017 | Healy | G06Q 40/08 |
| 10,262,373 B2* | 4/2019 | Hayward | G06Q 40/08 |
| 2004/0254698 A1 | 12/2004 | Hubbard et al. | |
| 2007/0027583 A1 | 2/2007 | Tamir et al. | |
| 2007/0257815 A1* | 11/2007 | Gunderson | G08G 1/16 340/903 |
| 2008/0122603 A1 | 5/2008 | Plante et al. | |
| 2008/0319639 A1 | 12/2008 | Yamane | |
| 2011/0213628 A1* | 9/2011 | Peak | G06Q 40/08 705/4 |
| 2012/0016695 A1* | 1/2012 | Bernard | G06Q 40/08 705/4 |
| 2012/0209634 A1 | 8/2012 | Ling et al. | |
| 2013/0046562 A1 | 2/2013 | Taylor et al. | |
| 2013/0338914 A1 | 12/2013 | Weiss | |
| 2014/0058761 A1 | 2/2014 | Freiberger et al. | |
| 2014/0095214 A1 | 4/2014 | Mathe et al. | |
| 2014/0108058 A1 | 4/2014 | Bourne et al. | |
| 2014/0257874 A1 | 9/2014 | Hayward et al. | |
| 2014/0278574 A1 | 9/2014 | Barber | |
| 2014/0303833 A1 | 10/2014 | Phelan et al. | |
| 2014/0330596 A1 | 11/2014 | Depura et al. | |
| 2015/0324923 A1* | 11/2015 | Christensen | G06Q 40/08 705/4 |
| 2017/0162041 A1 | 6/2017 | Downs et al. | |

FOREIGN PATENT DOCUMENTS

| | | |
|---|---|---|
| JP | 2007-179348 A | 7/2007 |
| WO | WO 2010/011806 A1 | 2/2010 |
| WO | WO 2014/031723 A2 | 2/2014 |

OTHER PUBLICATIONS

He, Qing et al.; "IBM Research Report—Incident Duration Prediction with Hybrid Tree-Based Quantile Regression"; Mathematics; RC25175 (W1106-070); Jun. 21, 2011; 19 pages.

Horvitz E. et al.; (2005). "Prediction, Expectation, and Surprise: Methods, Designs, and Study of a Deployed Traffic Forecasting Service"; Twenty-First Conference on Uncertainty in Artificial Intelligence, UAI-2005, Edinburgh, Scotland, Jul. 2005.

International Preliminary Report on Patentability from International Application No. PCT/IB15/59267, dated Jun. 16, 2017, 19 pages.

International Search Report and Written Opinion from International Application No. PCT/IB15/59267, dated Mar. 17, 2016, 12 pages.

Extended European Search Report for Application No. EP 15 86 6066 dated Aug. 16, 2018, 12 pages.

* cited by examiner

METHOD AND APPARATUS FOR DETERMINING LOCATION-BASED VEHICLE BEHAVIOR

CROSS-REFERENCE TO A RELATED APPLICATION

The present application claims priority to U.S. Provisional Patent Application No. 62/086,566, filed Dec. 2, 2014, the entire contents of which are incorporated herein by reference in their entirety.

TECHNOLOGICAL FIELD

An example embodiment of the present invention relates generally to the determination of vehicle behavior and, more particularly, to the comparison of the behavior of a vehicle to that of other vehicles at the same location that are also subjected to the same or similar environmental conditions.

BACKGROUND

Vehicle insurance is generally based on relatively basic information relating to the vehicle and the driver. For example, vehicle insurance may be based on information regarding the type of vehicle, the condition or status of the vehicle, the age of the vehicle and/or the state in which the vehicle is registered. With respect to the driver, vehicle insurance may also be based on information regarding the age of the owner, the residence of the owner, such is determined by the zip code of the owner's residence, and/or the status of the owner, such as the marital status of the owner, the employment status of the owner or the like. Further, vehicle insurance may be based upon other types of information, such as the estimated or actual annual mileage of the vehicle and/or the primary use of the vehicle, e.g., work, personal, etc.

In an effort to obtain additional information regarding vehicle behavior such that usage based insurance pricing may be tailored more specifically to the behavior of a particular vehicle, insurance companies are increasingly encouraging their customers to attach devices to their vehicles to log the location of the vehicles. Based upon the devices that log the location of the vehicle, usage based insurance pricing may take into account the travel distance of a vehicle and, in some instances, the driving performance of the vehicle. However, usage based insurance pricing still generally relies upon relatively generic information.

BRIEF SUMMARY

A method, apparatus and computer program product are provided in accordance with an example embodiment in order to provide more detailed information regarding vehicular behavior. For example, the method, apparatus and computer program product of an example embodiment may compare the behavior of a vehicle to other vehicles at the same location that are subjected to the same environmental conditions. The more detailed information regarding vehicular behavior may be utilized for a variety of purposes including the assessment of the behavior of the vehicle in relation to one or more risk factors which may, in turn, be utilized in conjunction with usage based insurance pricing.

In an example embodiment, a method is provided that includes receiving information regarding a location of the vehicle at a plurality of instances in time. The plurality of instances in time define a time period. The method also includes determining an environmental condition at the location during the time period and comparing the behavior of the vehicle to that of other vehicles at the location that are also subjected to the environmental condition. Additionally, the method of an example embodiment may determine a score for the vehicle in relation to a risk factor based upon the behavior of the vehicle and the comparison to other vehicles at the location that are also subjected to the environmental condition.

In another example embodiment, an apparatus is provided that includes at least one processor and at least one memory including computer program code with the at least one memory and the computer program code configured to, with the processor, cause the apparatus to receive information regarding a location of a vehicle at a plurality of instances in time. The plurality of instances in time define a time period. The at least one memory and the computer program code are also configured to, with the processor, cause the apparatus of the example embodiment to determine an environmental condition at the location during the time period and to compare behavior of the vehicle to that of other vehicles at the location that are also subjected to the environmental condition. In an example embodiment, the at least one memory and the computer program code may be further configured to, with the processor, cause the apparatus to determine the score for the vehicle in relation to a risk factor based upon the behavior of the vehicle in comparison to other vehicles at the location that are also subjected to the environmental condition.

In a further example embodiment, a computer program product is provided that includes at least one non-transitory computer-readable storage medium having computer-executable program code portions stored therein with the computer-executable program code portions including program code instructions configured to receive information regarding a location of a vehicle at a plurality of instances in time. The plurality of instances in time define a time period. The computer-executable program code portions also include program code instructions configured to determine an environmental condition at the location during the time period and program code instructions configured to compare behavior of the vehicle with that of other vehicles at the location that are also subjected to the environmental condition. The computer-executable program code portions of an example embodiment may also include program code instructions configured to determine a score for the vehicle in relation to a risk factor based upon the behavior of the vehicle in comparison to other vehicles at the location that are also subjected to the environmental condition.

In yet another example embodiment, an apparatus is provided that includes means for receiving information regarding a location of a vehicle at a plurality of instances in time. The plurality of instances in time define a time period. The apparatus of this example embodiment also includes means for determining an environmental condition at the location during the time period and means for comparing the behavior of the vehicle to that of other vehicles at the location that are also subjected to the environmental condition.

BRIEF DESCRIPTION OF THE DRAWINGS

Having thus described certain example embodiments of the present invention in general terms, reference will hereinafter be made to the accompanying drawings which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to compare the behavior of a vehicle to that of other vehicles at the same location that are also subjected to the same environmental conditions. Based upon this comparison, the method, apparatus and computer program product may provide information that may be utilized for a wide variety of purposes including for insurance purposes, such as insurance pricing, governmental purposes, such as road tax pricing, traffic management purposes and vehicle relationship management purposes, such as for vehicle resale, driver feedback, training, etc. By way of example, but not of limitation, the method, apparatus and computer program product of an example embodiment will be hereinafter described in conjunction with the analysis of vehicular behavior for purposes of insurance pricing, such as usage based insurance pricing.

Figure 1:
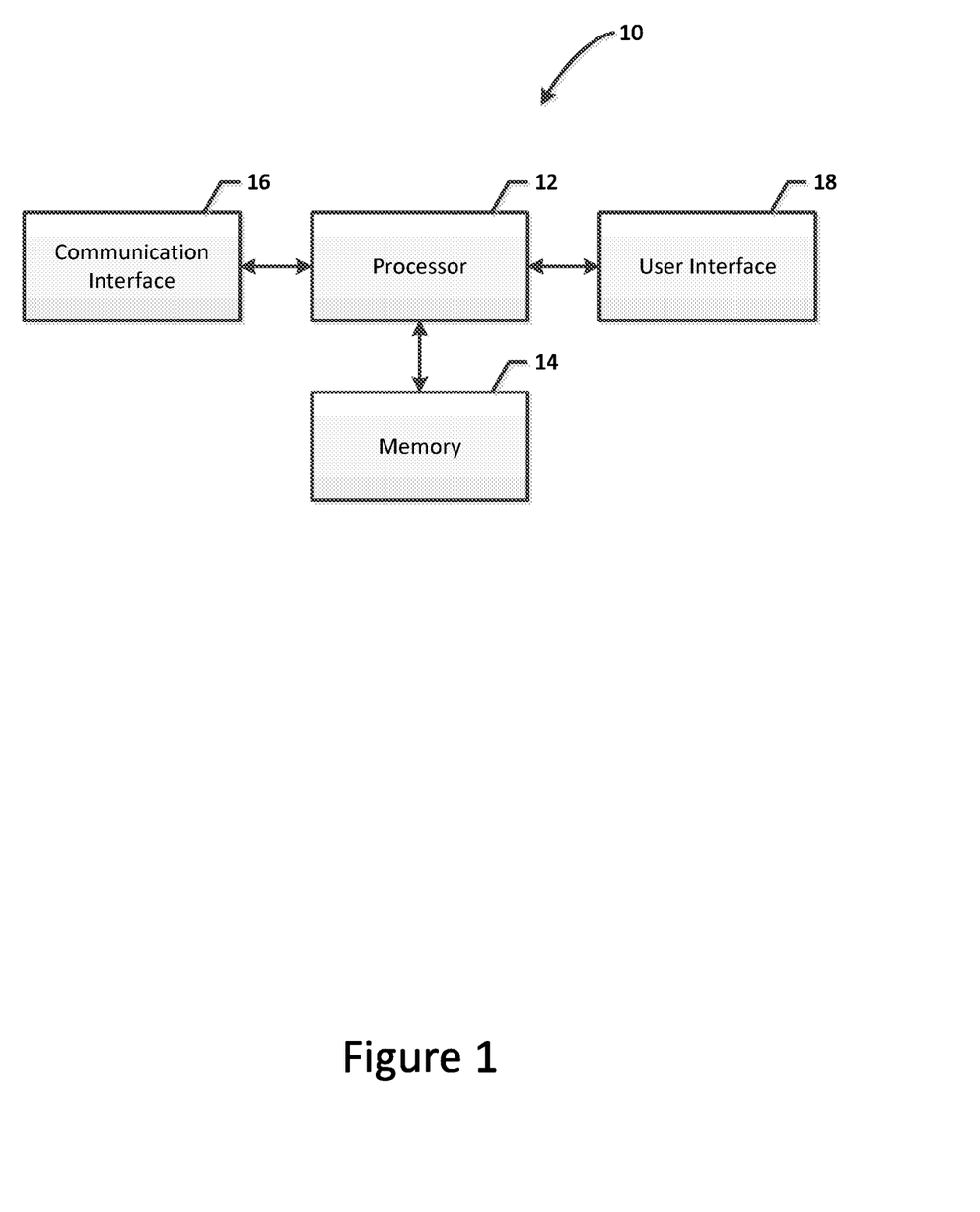
FIG. 1 is a block diagram of a computing device that may be specifically configured in accordance with an example embodiment of the present invention.

The apparatus of an example embodiment may be embodied by a computing device, such as a server, a computer or a plurality of computers that are in communication with one another or otherwise networked together. Regardless of the manner in which the apparatus is embodied, FIG. 1 depicts an apparatus 10 that may be specifically configured in accordance with an example embodiment of the present invention. In this regard, the apparatus of FIG. 1 include, be associated with or otherwise be in communication with a processor 12, a memory device 14, a communication interface 16 and user interface 18. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 10 may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment may also include a communication interface 16 that may be any means such as a device or circuitry embodied in either hardware or a combination of hardware and software that is configured to receive and/or transmit data from/to other electronic devices in communication with the apparatus, such as by being configured to receive data from an in-vehicle global positioning system (GPS), in-vehicle navigation system, a personal navigation device (PND), a portable navigation device or other in-vehicle data collection system. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

The apparatus 10 of an example embodiment may also include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms and/or to receive the user input provided via the input mechanisms, such as the rotatable dial wheel. The processor and/or user interface circuitry comprising the processor may be configured to control one or more functions of one or more input/output mechanisms through computer program instructions (for example, software and/or firmware) stored on a memory accessible to the processor (for example, memory device 14, and/or the like).

Figure 2:
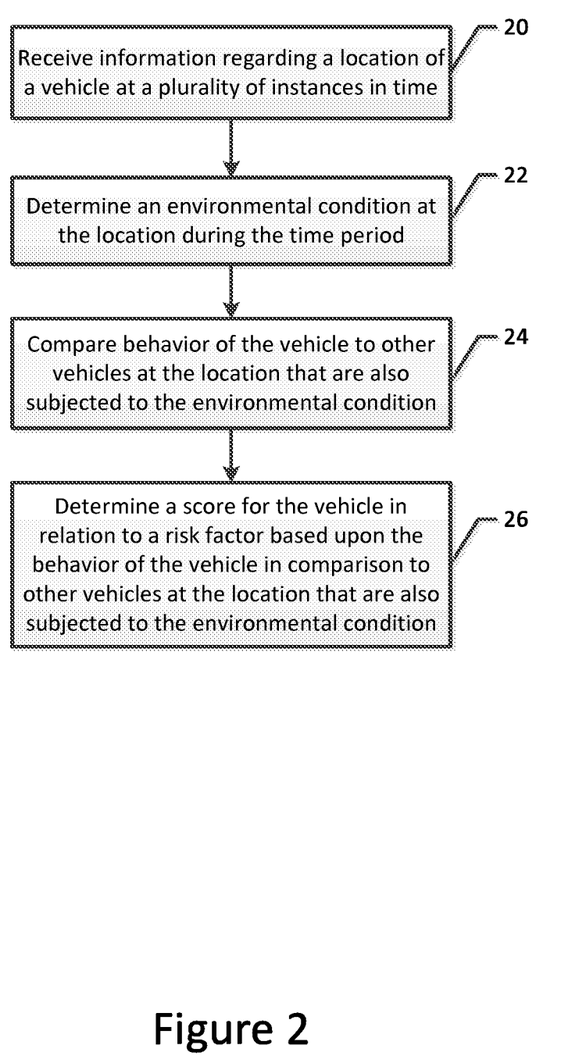
FIG. 2 is a flowchart illustrating operations performed, such as by the computing device of FIG. 1, in accordance with an example embodiment of the present invention.

Referring now to FIG. 2, the operations performed, such as by the apparatus 10 of FIG. 1, in accordance with an example embodiment are depicted. As shown in block 20, the apparatus may include means, such as the communication interface 16, the processor 12 or the like, for receiving information regarding the location of a vehicle at a plurality of instances in time. The plurality of instances in time define a time period, such as a time period that extends from the first instance in time to the last instance in time for which information regarding the location of the vehicle is received. In this regard, information may be provided regarding the position of the vehicle and a time stamp that identifies the time at which the vehicle was at the respective position. The information regarding the position of the vehicle at the plurality of instances in time may be captured in various manners including, for example, by a GPS carried by the vehicle and configured to repeatedly capture the position of the vehicle as well as a time stamp associated with each position determination. The information regarding the location of the vehicle at the plurality of instances in time may be stored, such as by memory 14.

Figure 3:
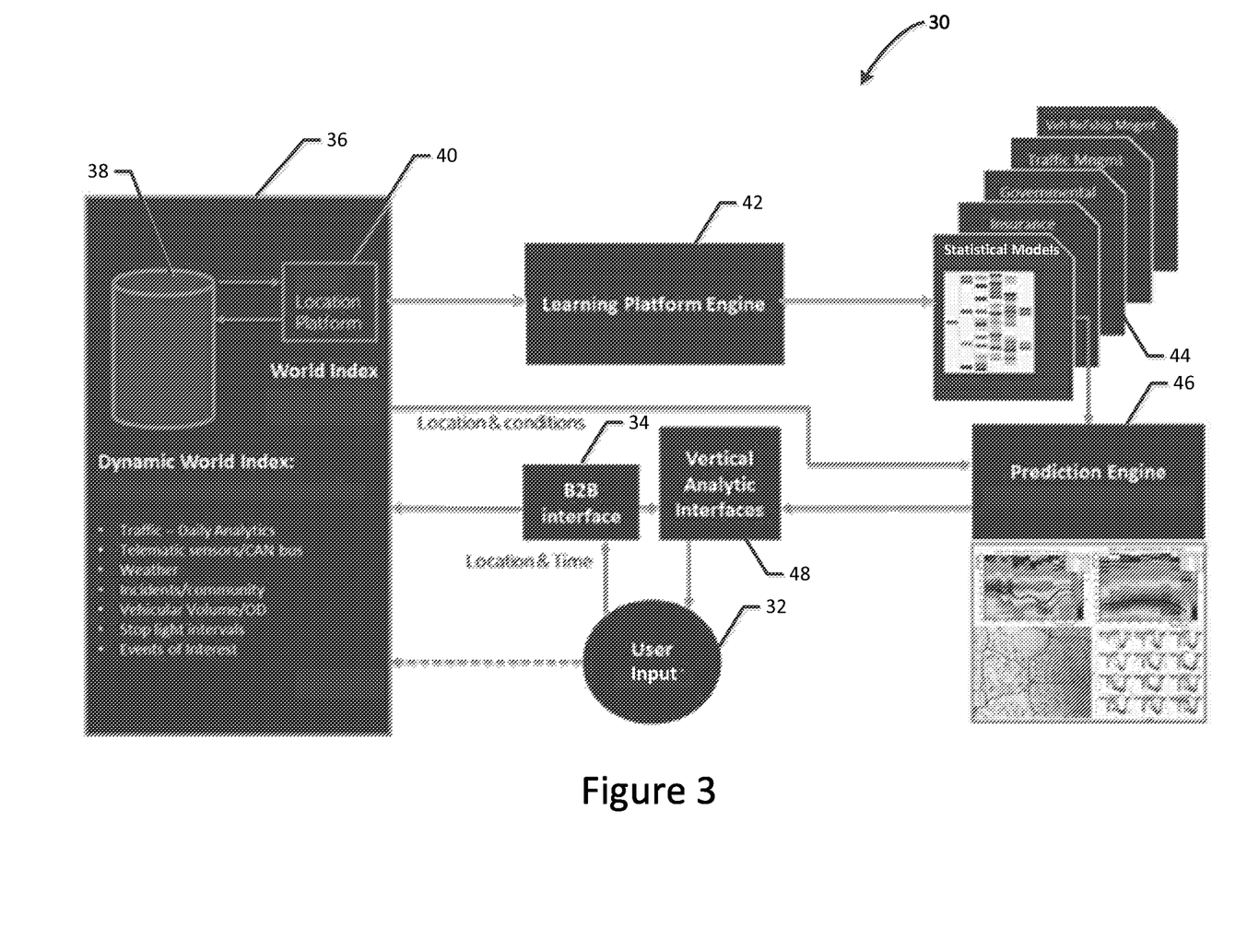
FIG. 3 is a block diagram of a more detailed implementation of a computing device that may be specifically configured in accordance with an example embodiment of the present invention.

A more detailed implementation of the apparatus 10 of FIG. 1 is represented by the apparatus 30 of FIG. 3. In this example embodiment, the communication interface 16 may be configured to receive the information regarding the location of the vehicle at the plurality of instances in time directly from the user, such as the driver of the vehicle, via user input 32. Alternatively, the communication interface may include a business-to-business (B2B) interface 34 that receives, from the user, vehicular information regarding the location of a vehicle at the plurality of instances in time. The memory 36 of the apparatus of the embodiment of FIG. 3 may include a dynamic world index 38 that stores the information that is received regarding the location of the vehicle at the plurality of instances in time. In addition to storing the information regarding the location of a vehicle at the plurality of instances in time, the dynamic world index may include a variety of other information including traffic-daily analytics, telematics sensor data and data, weather information, such as historic weather information at a plurality of different locations at various points in time, data regarding incidents or community activities, such as information regarding accidents at various locations on the roadways, information regarding various events, such as sporting events, concerts, etc., information regarding vehicular volume on respective roadways, stop light intervals and other events of interest. The information stored by the dynamic world index may be updated, such as on a periodic, e.g., daily, basis. The memory of the embodiment of FIG. 3 may also include a location platform 40 that stores a map of the roadways on which the vehicles will drive and speed limits associated with those roadways.

In an example embodiment, the location platform 40 includes or otherwise is in communication with a geographic database, such as may be stored in memory 36. For example, the geographic database includes node data records, road segment or link data records, point of interest (POI) data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In example embodiments, the road segment data records are links or segments representing roads, streets, or paths, as can be used in the calculated route or recorded route information for determination of one or more personalized routes, according to example embodiments. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city), In addition, the geographic database can include event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the computing device, for example. The navigation-related functions can correspond to vehicle navigation, pedestrian navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The apparatus 10 of an example embodiment also includes means, such as the processor 12 or the like, for determining the location of the vehicle at the plurality of instances in time to be at particular locations on one or more roadways as defined by the geographic database. In this regard, the processor is configured to match the information regarding the location of the vehicle at a respective instance in time to data from the geographic database defining the location of various roadways so as to determine the roadways on which the vehicle is traveling at the plurality of instances in time.

As shown in block 22 of FIG. 2, the apparatus 10 also includes means, such as the processor 12 or the like, for determining an environmental condition at the location of the vehicle during the time period for which information was received. Various types of environmental conditions may be determined including, for example, the weather at the location of the vehicle during the time period, an incident along the roadway such as an accident or construction along the roadway along which the vehicle is traveling during the time period or an unusually heavy volume of traffic on the roadway along which the vehicle is traveling during the time period, such as a traffic volume that exceeds a predefined traffic volume threshold. In order to determine the environmental condition, the processor of an example embodiment is configured to access the memory 14, such as the dynamic world index 38, in order to obtain information regarding one or more environmental conditions at the location during the time period. Based upon the information provided by the memory, the processor is configured to determine whether there was an environmental condition, such as rain, snow, fog, an accident, road construction, heavy traffic volume or the like.

As shown in block 24 of FIG. 2, the apparatus 10 also includes means, such as the processor 12 or the like, for comparing the behavior of the vehicle to other vehicles at the location that are also subjected to the environmental condition. For example, the processor of an example embodiment is configured to compare the speed of the vehicle to the speed of other vehicles at the location that are also subjected to the same environmental conditions, such as rain, snow, fog, an accident, heavy traffic volume or the like. In this regard, an environmental condition may be considered to be the same if the environmental condition experience by other vehicles is within a predefined range of the environmental condition experienced by the respective vehicle that is the subject of the analysis. The apparatus, such as the processor, may be configured to compare the behavior of the vehicle to that of other vehicles at the same location and subjected to the same environmental condition in various manners. In an example embodiment, however, the processor includes a learning platform engine 42 as shown in FIG. 3 that utilizes a filtered representation of the data provided by memory 36, such as the dynamic world index 38, to create statistical models 44 which describe the manner in which a population or at least a portion of a population behaves under various environmental conditions or combinations of environmental conditions, such as the range of speeds at which vehicles are driven at the location by a population under different environmental conditions.

In an example embodiment, the processor 12, such as the learning platform engine 42, is configured to generate the statistical models 44 using regression trees with different models being generated for different industries depending upon the interest of the respective industries. For example, an insurance industry may be more interested in the free flow population of vehicle speeds along the roadway with less interest in the manner in which the vehicle speed population is affected due to increased traffic conditions, while the traffic management industry may have less interest in the free flow population of vehicle speeds and more interested in the manner in which the population responded to changing traffic conditions. The learning platform engine of an example embodiment is configured to generate the statistical models offline or otherwise in advance of the comparison of the behavior of a respective vehicle to that of a population of vehicles. Further details regarding the generation of statistical models using regression trees is provided by U.S. patent application Ser. No. 14/171,049 entitled "Predictive Incident Aggregation" filed on Feb. 3, 2014, the contents of which are incorporated herein by reference in their entirety. As such, the apparatus 10, such as the processor, of an example embodiment is configured to generate a plurality of statistical models representative of the behavior of other vehicles at the location that are subjected to different, respective environmental conditions.

In the example embodiment of FIG. 3, the processor 12 also includes a prediction engine 46 that is configured to utilize one or more of the statistical models 44 in combination with information regarding location and environmental conditions from the dynamic world index 38 so as to determine the appropriate portion of a statistical model to be utilized for the comparison to the specific vehicular performance. In this regard, the portion of the statistical model to be utilized is identified based upon the location of the vehicle and the environmental condition at the location during the relevant time period. For example, in an instance in which the processor has determined from reference to the dynamic world index 38 that the vehicle was driving through rain, the processor, such as the prediction engine, is configured to obtain the portion of the statistical model that relates to vehicular performance while driving in rain and, in particular, the portion of this statistical model relating to driving a vehicle in rainy conditions at the location for which vehicular information was received. As such, the apparatus 10, such as the processor, of an example embodiment is configured to determine a statistical model representative of the behavior of the other vehicles at the location that are also subjected to the environmental condition and to then compare the behavior of the vehicle to the statistical model representative of the behavior of the other vehicles at the location that are also subjected to the environmental condition.

The apparatus 10 also includes means, such as the processor 12, the user interface 18 or the like, for providing information regarding the behavior of the vehicle in relation to the behavior other vehicles at the same location that are also subjected to the environmental condition. The user interface may provide the information in various manners including a display depicting the behavior of the respective vehicle that is the subject of the analysis to that of other vehicles at the same location that are subjected to the same environmental conditions. Additionally or alternatively, the apparatus, such as a processor, may provide a file download that includes the model estimations for the location during the time period. Still further, the apparatus, such as the user interface or, more particularly, the vertical analytic interface 48 of FIG. 3, may provide an interactive dashboard analytic to allow examination of the manner in which the performance of a respective vehicle compares to the relevant portion of a statistical model 44.

In an example embodiment, the apparatus 10 further includes means, such as the processor 12 or the like, for determining a score for the vehicle in relation to a risk factor based upon the behavior of the vehicle in comparison to that of other vehicles at the same location that are also subjected to the environmental conditions. See block 26 of FIG. 2. In this regard, various risk factors may be taken into account with each risk factor being based upon the behavior of the vehicle in comparison to other vehicles at the location that are also subjected to a different, respective environmental condition. For example, respective risk factors may be associated with driving in rainy conditions, snowy conditions, foggy conditions, heavy traffic conditions, heavy traffic conditions or in the vicinity of an accident or road construction. As another example in an instance in which a vehicle is parked, the risk factor may involve risk of theft of or damage to the vehicle and, as such, may take into account the local crime rates in the area in which the vehicle is parked.

Figure 4:
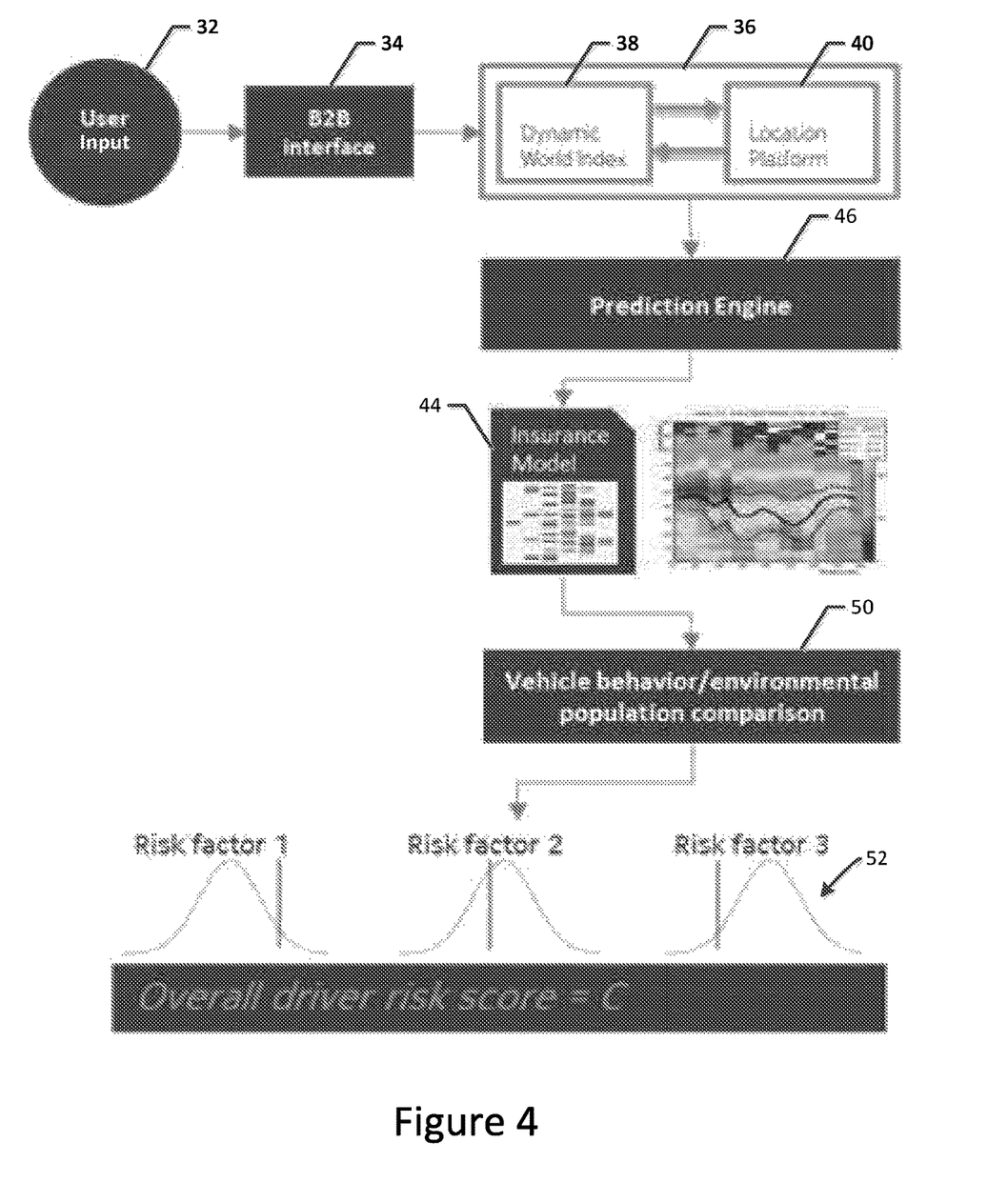
FIG. 4 is a block diagram illustrating data flow relating to usage based insurance in accordance with an example embodiment of the present invention.

In an example embodiment depicted in FIG. 4, the processor 12 may compare the behavior of the respective vehicle to other vehicles at the same location that are also subjected to the environmental condition, as shown in block 50. As a result, the processor of this example embodiment determines three different scores for the respective vehicle in relation to risk factor 1, risk factor 2 and risk factor 3, as shown at 52. In this regard, the score for the respective vehicle is shown as a vertical line, while the behavior of the other vehicles at the same location that are also subjected to the environmental condition is shown by a distribution, such as the curved distributions of FIG. 4. Thus, with respect to risk factor 1, the score for the respective vehicle is greater than the majority of the other vehicles at the same location that are subjected to the environmental condition, while the scores for the respective vehicle with respect to risk factor 2 and risk factor 3 are less than the scores for the majority of other vehicles at the same location that are also subjected to the environmental conditions. Based upon the scores for the respective vehicle with respect to one or more risk factors, an overall driver risk score C may be determined, such as by the processor. The risk assessment of the vehicle and/or the driver may then be utilized for a wide variety of purposes as described above, such as for insurance pricing, traffic management or the like.

By way of example, the apparatus 10, method and computer program product may compare the behavior of a vehicle to the behavior of a broader segment of the population under various environmental conditions in order to inform actuarial calculations for insurance purposes. In this regard, models of vehicle population behavior may be created for different environmental conditions including, for example, different roadway conditions along different stretches of the roadway. The parameters that are modeled may include the population of speeds on a roadway, the population of acceleration and/or braking along a roadway, the vehicle volume population and/or a measure of the likelihood of an accident on a roadway. The path traveled by a respective vehicle may then be determined with reference to the map defined by a geographic database. Based upon the time at which the respective vehicle drove along a particular roadway, the environmental conditions that the vehicle experience may be determined, such as with reference to historical archives of environmental conditions stored by memory 14 or by accessing real-time environmental conditions. The environmental conditions that are considered with respect to the respective vehicle may include roadway attributes, e.g., highway versus arterial roadway, presence of traffic lights and/or stop signs, highway on/off ramp, road lane configuration, roadway curvature and/or presence of a school zone, vehicle volume measurements, weather conditions and a roadway traction index. The actual behavior of the respective vehicle may then be compared to the vehicle population behavior under the same environmental conditions along the same stretch of roadway. For example, the percentile of the speed of the respective vehicle to the speed of the vehicle population under the same environmental conditions along the same stretch of roadway may be determined. The behavior of the respective vehicle in relation to the vehicle population behavior under the same environmental conditions along the same stretch of roadway may be provided to an insurance carrier. Alternatively, the behavior may be further aggregated. For example, the behavior of the respective vehicle may be tracked over an extended distance and time period and may be compared repeatedly to the broader vehicle population. As such, a more generalized characterization or score for the vehicle may be determined. The more generalized characterization may be the percentage of time that a vehicle may be above or below a predefined percentile of the population speed, the percentage of time that vehicle is driving in congested conditions and the distance and/or time that the vehicle spends traversing roadways that are prone to accidents, such as by having at least a predefined number of accidents in a certain time period.

As another example, a score that defines the manner in which a driver responds to various environmental conditions for different stretches of the roadway may be determined relative to a model of the vehicle population model. In this regard, the manner in which a driver performs may be tracked over a period of time and compared to the behavior of a broader population of vehicles under the same or similar environmental situations. This comparison may result in a score for the driver in regards to one or more driving performance factors (relative to the manner in which the broader population of vehicles performed) including, for example, hard braking/acceleration, lateral acceleration (which may be indicative of the sharpness at which turns are taken), speed, deceleration into/acceleration out of turns, following distance to cars ahead, efficiency (speed/energy expended) of routes driven, ability to find rounds more efficient than those suggested by a routing application and/or time lost due to congestion. The comparison and the resulting score for the driver relative to the broader population of vehicles may be utilized for various purposes including further informing actuarial calculations for insurance purposes and/or providing information related to the performance of a professional driver, such as a bus driver, a limousine driver, a taxi driver, an uber driver or the like.

In regards to vehicle relationship management (VRM), the behavior of a vehicle over an extended period of time may be monitored by collecting data points representative of the operation of the vehicle and the environmental conditions to which the vehicle is subjected. A model related to the life cycle of various vehicle components may also be defined based on a broader vehicle population. As such, the behavior of the vehicle may be compared to the model of the broader vehicle population to predict or detect that a specific component of the vehicle is likely to need maintenance in the near future and to alert the owner of the vehicle accordingly. The information may also or alternatively be shared with a vehicle repair enterprise, which may provide the owner of the vehicle with offers of repair/maintenance in an effort to attract business. In this regard, the behavior of the vehicle may be compared to a model of the broader vehicle population in order to guide a determination as to the value of the vehicle based on indications of vehicular degradation, e.g., wear and tear, such as by serving as an offset or multiplier to an average vehicle value.

In this regard, a model of vehicle component wear may be created for different environmental conditions, including different roadway conditions, along various distinct stretches of roadway. The parameters that are modeled for vehicular component wear may include the propensity of the chassis to rust in a particular geographic area (such as may be determined based upon salt usage on a roadway during snow conditions), stress placed on the engine and/or brakes of a vehicle due to geographic topography, stress placed on the clutch due to, for example, stopping and starting along a local roadway in comparison to more consistent driving along a highway, damage to the floor of a vehicle due to driving a speed over a rough roadway, stress placed upon an air conditioning system due to driving in hot temperatures and/or usage of the wiper blades brought about by driving in wet conditions. Other vehicular parameters that may be modeled may be provided by the onboard computer system of a vehicle, such as from the onboard diagnostic (OBDII) port or the controller area network (CAN) bus, and may include vehicle location and the environmental conditions, speed, gear usage, wiper usage, anti-lock braking system (ABS) engagement, active suspension engagement and/or headlight usage. Based upon the vehicular parameters provided by the onboard computer system, the parameters related to vehicular component wear may be determined relative to the broader vehicular population, such as by comparing the actual vehicle behavior to the behavior of the broader vehicle population and then modifying the parameters related to vehicular component wear that had been determined for the broader vehicle population accordingly to take into account the actual vehicle behavior. In an example embodiment, the parameters related to vehicular component wear may be aggregated for various components to determine an overall wear score for the vehicle. Based on the wear score for a vehicle, vehicle maintenance schedules may be guided, an indication of the condition of the vehicle may be provided, a value assessment of the vehicle may be guided such as by placing the vehicle value with a range of known vehicle sales prices based on the observed wear and tear.

In addition, by tracking the stress experienced by various components of a vehicle prior to the failure of a component, supply-chain decisions associated with the potential for improvements in the quality of various components of the vehicle may be informed so as to reduce vehicle warranty claims. In this regard, the behavior of a population of vehicles may be tracked over a period of time. This behavior may include the failure of various components of the vehicle and the environmental conditions to which the vehicle was subjected that led to the component failure. Additionally or alternatively, the time-to-failure or the percentage of life used may be tracked for the various components of the vehicle as well as the environmental conditions to which the vehicle was subjected that led to the component failure. The population of component failures may then be assessed under various environmental conditions to determine instances in which components should be improved or optimized for certain environmental conditions to reduce component failure and to correspondingly reduce warranty costs.

In another example embodiment, the behavior of a vehicle population may be monitored under diverse environmental conditions and a corresponding model may be created. The resulting model may be compared to the current and predicted roadway conditions to evaluate management options to achieve improved network usage. The vehicular population characteristics that may be monitored for various roadways may include vehicle volume/throughput, vehicle speeds, vehicle braking point and/or accidents along a roadway. The various environmental conditions to which the population of vehicles may be subjected may include temperature, visibility, traffic light cadence, road friction coefficient (e.g., slipperiness) and/or events of interest. A model may be create for the vehicular population behavior for each of a plurality of different sets of environmental conditions. Factors which influence the roadway usage (in terms of vehicular traffic) may then be identified and modifications to the environmental conditions (traffic light timing, schedule of roadwork, etc.) may be made, if desired. For example, based upon a comparison of real time data to the model parameters, inefficiencies may be detected relative to the model and remedial action may be taken. By way of example, in an instance in which vehicle congestion is observed along a particular roadway related to higher than normal traffic, traffic light timings can be altered based on evidence provided by the model of the roadway that indicates that the modification to the traffic light timings can reduce the observed backups. Similarly, in instances in which adverse environmental conditions are predicted, remedial measures may be taken based upon evidence provided by the models. For example, since roadway accidents increase during icy road conditions and the model evidences that salting of roadway reduces accidents, remedial salting of a roadway could be performed in advance of icy conditions to reduce road iciness. As another example, since the model evidences that the use of headlights reduces accidents in reduced visibility conditions, highway signage that reminds drivers to turn on their headlights and increase their following distance to vehicles ahead may be activated during reduced visibility conditions.

By way of another example, a rental care business may utilize an example embodiment of the apparatus 10, method and computer program product to charge customers appropriately for insurance. In this regard, a base rate for rental car insurance may be defined and charged upon renting the vehicle. In addition, the customer may be advised of a range of potential insurance costs depending upon their driving behavior and the method by which the final insurance cost will be calculated. The behavior of the vehicle may then be monitored during the rental period. Models of the insurance cost relative to the behavior of the vehicle may be defined and may either be maintained by a network server or shared with the application onboard the vehicle. Based upon a comparison of the behavior of the vehicle to the models, real time feedback may be provided to the driver regarding the impact of their driving behavior upon the final cost of the rental car insurance. Parameters related to the behavior of the vehicle that may be taken into account may include the control of the vehicle, the types of roadways traveled, the specific roadways traveled, the time at which the vehicle is driven and/or the conditions of the roadway. Based upon the real time feedback, a rental car driver may adjust their behavior if they wish to correspondingly alter the insurance costs. The final cost of the insurance may then be communicated to the rental car customer upon the return of the vehicle.

Further, a road management agency may utilize infrastructure usage billing to charge for usage based on measured consumption as opposed to a flat fee, thereby permitting the pricing to be improved. As a result, drivers may be charged appropriately when the infrastructure is underutilized, such as during holidays that do not invoke much travel, in order to encourage usage. Additionally or alternatively, drivers may be charged appropriately when the infrastructure is more likely to be under stress, such as during hot or damaging weather conditions during which usage may damage the tarmac and/or in congested conditions, in order to discourage usage. Still further, drivers may be charged in a manner that discourages behaviors that add to infrastructure costs, such as in instances in which vehicles damage the infrastructure, or reduce infrastructure efficiency, such as in instances in which vehicles behave in a manner that causes congestion by, for example, changing lanes and/or stopping/starting which creates undesirable traffic waves.

In this example embodiment, a model of the behavior of a population of vehicles along a stretch of roadway is constructed. The model may, in turn, be linked to a model of the utilization cost of the roadway. The behavior of a respective vehicle may also be tracked over the stretch of roadway and compared to the model of the behavior of the population of vehicles. Based upon association of the model to the model of the utilization cost, the impact of the behavior of the respective vehicle upon its utilization cost may be determined and, in some instances, real time feedback may be provided to the driver. In this regard, the cost for the driver to utilize the stretch of roadway may be modified based upon the congestion of the roadway, the environmental conditions and/or the behavior of the respective vehicle. The utilization cost for the respective vehicle may be determined after taking into account each of the foregoing modifications and the vehicle may then be appropriately charged, such as via a toll pass/account.

As described above, FIG. 2 illustrates a flowchart of an apparatus 10, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    receiving information regarding a location of a vehicle at a plurality of instances in time, wherein the plurality of instances in time define a time period that extends from a first instance in time to a subsequent instance in time for which information regarding the location of the vehicle is received, wherein the received information regarding the location of the vehicle includes a crime rate in an area including the location of the vehicle;
    determining a real-time environmental condition at the location during the time period;
    comparing behavior of the vehicle to other vehicles at the location during the time period that are also subjected to the real-time environmental condition, wherein comparing the behavior of the vehicle to other vehicles comprises determining a statistical model representative of the behavior of the other vehicles at the location during the time period that are also subjected to the real-time environmental condition and comparing the behavior of the vehicle to the statistical model representative of the behavior of the other vehicles at the location that are also subjected to the real-time environmental condition;
    determining a score for the vehicle in relation to a first risk factor based upon the crime rate and also at least a second risk factor based upon the behavior of the vehicle in comparison to the statistical model representative of the behavior of the other vehicles at the location during the time period that are also subjected to the real-time environmental condition; and
    utilizing the score for at least one of insurance pricing, determination of infrastructure usage, traffic management, vehicle relationship management, determination of professional driver performance, vehicle maintenance, vehicle valuation or determination of stress experienced by one or more components of a vehicle in order to inform supply-chain decisions.

2. The method according to claim 1 wherein determining a score for the vehicle comprises determining a score for the vehicle in relation to a plurality of risk factors, each risk factor based upon the behavior of the vehicle in comparison to other vehicles at the location during the time period that are also subjected to a different, respective environmental condition.

3. The method according to claim 1 further comprising generating a plurality of statistical models representative of the behavior of other vehicles at the location during the time period that are subjected to different, respective environmental conditions.

4. The method according to claim 1 further comprising determining the location of the vehicle along a roadway as defined by a geographic database.

5. The method according to claim 1 wherein determining the real-time environmental condition comprises determining the environmental condition at the location during the time period to be within a range of environmental conditions.

6. The method according to claim 1 wherein the real-time environmental condition comprises one or more of a weather condition at the location of the vehicle, an incident along a roadway on which the vehicle is traveling or a volume of traffic along the roadway on which the vehicle is traveling.

7. The method according to claim 1 wherein in an instance in which the vehicle is parked, the risk factor is at least partially based upon a risk of theft of or damage to the vehicle.

8. An apparatus comprising at least one processor and at least one memory including computer program code, the at least one memory and computer program code configured to, with the processor, cause the apparatus to at least:
    receive information regarding a location of a vehicle at a plurality of instances in time, wherein the plurality of instances in time define a time period that extends from a first instance in time to a subsequent instance in time for which information regarding the location of the vehicle is received, wherein the received information regarding the location of the vehicle includes a crime rate in an area including the location of the vehicle;
    determine a real-time environmental condition at the location during the time period;
    compare behavior of the vehicle to other vehicles at the location during the time period that are also subjected to the real-time environmental condition, wherein the behavior of the vehicle to other vehicles is compared by determining a statistical model representative of the behavior of the other vehicles at the location during the time period that are also subjected to the real-time environmental condition and comparing the behavior of the vehicle to the statistical model representative of the behavior of the other vehicles at the location that are also subjected to the real-time environmental condition;

determine a score for the vehicle in relation to a first risk factor based upon the crime rate and also at least a second risk factor based upon the behavior of the vehicle in comparison to the statistical model representative of the behavior of the other vehicles at the location that are also subjected to the real-time environmental condition; and utilize the score for at least one of insurance pricing, determination of infrastructure usage, traffic management, vehicle relationship management, determination of professional driver performance, vehicle maintenance, vehicle valuation or determination of stress experienced by one or more components of a vehicle in order to inform supply-chain decisions.

9. The apparatus according to claim 8 wherein the at least one memory and computer program code are configured to, with the processor, cause the apparatus to determine a score for the vehicle by determining a score for the vehicle in relation to a plurality of risk factors, each risk factor based upon the behavior of the vehicle in comparison to other vehicles at the location during the time period that are also subjected to a different, respective environmental condition.

10. The apparatus according to claim 8 wherein the at least one memory and computer program code are further configured to, with the processor, cause the apparatus to generate a plurality of statistical models representative of the behavior of other vehicles at the location during the time period that are subjected to different, respective environmental conditions.

11. The apparatus according to claim 8 wherein the at least one memory and computer program code are further configured to, with the processor, cause the apparatus to determine the location of the vehicle along a roadway as defined by a geographic database.

12. The apparatus according to claim 8 wherein the at least one memory and computer program code are configured to, with the processor, cause the apparatus to determine the real-time environmental condition by determining the environmental condition at the location during the time period to be within a range of environmental conditions.

13. The apparatus according to claim 8 wherein the real-time environmental condition comprises one or more of a weather condition at the location of the vehicle, an incident along a roadway on which the vehicle is traveling or a volume of traffic along the roadway on which the vehicle is traveling.

14. The apparatus according to claim 8 wherein in an instance in which the vehicle is parked, the risk factor is at least partially based upon a risk of theft of or damage to the vehicle.

15. A computer program product comprising at least one non-transitory computer-readable storage medium having computer-executable program code portions stored therein, the computer-executable program code portions comprising program code instructions configured to:

receive information regarding a location of a vehicle at a plurality of instances in time, wherein the plurality of instances in time define a time period that extends from a first instance in time to a subsequent instance in time for which information regarding the location of the vehicle is received, wherein the received information regarding the location of the vehicle includes a crime rate in an area including the location of the vehicle;

determine a real-time environmental condition at the location during the time period;

compare behavior of the vehicle to other vehicles at the location during the time period that are also subjected to the environmental condition, wherein the behavior of the vehicle is compared to other vehicles by determining a statistical model representative of the behavior of the other vehicles at the location during the time period that are also subjected to the environmental condition and comparing the behavior of the vehicle to the statistical model representative of the behavior of the other vehicles at the location during the time period that are also subjected to the environmental condition;

determine a score for the vehicle in relation to a first risk factor based upon the crime rate and also at least a second risk factor based upon the behavior of the vehicle in comparison to the statistical model representative of the behavior of the other vehicles at the location during the time period that are also subjected to the environmental condition; and utilize the score for at least one of insurance pricing, determination of infrastructure usage, traffic management, vehicle relationship management, determination of professional driver performance, vehicle maintenance, vehicle valuation or determination of stress experienced by one or more components of a vehicle in order to inform supply-chain decisions.

* * * * *